Dec. 26, 1933. J. F. BORDEN 1,940,993
THICKENER
Filed May 25, 1931 2 Sheets-Sheet 1
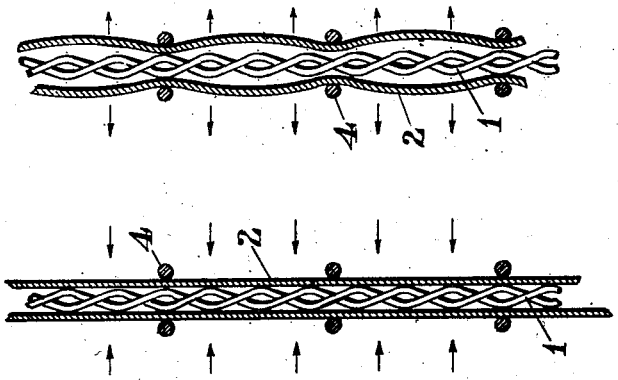
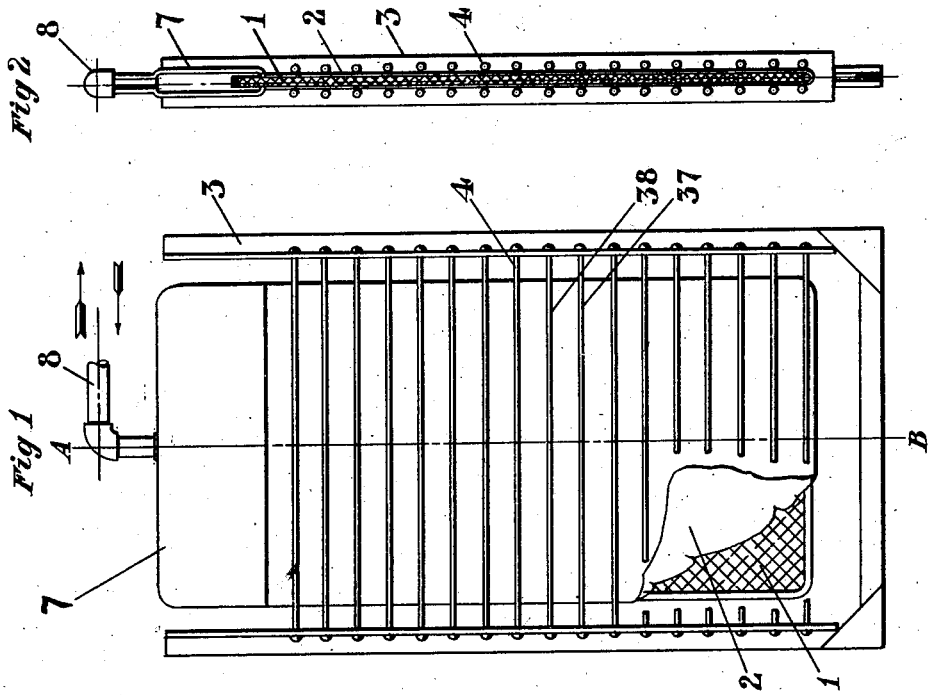
INVENTOR
John F. Borden
BY
ATTORNEY

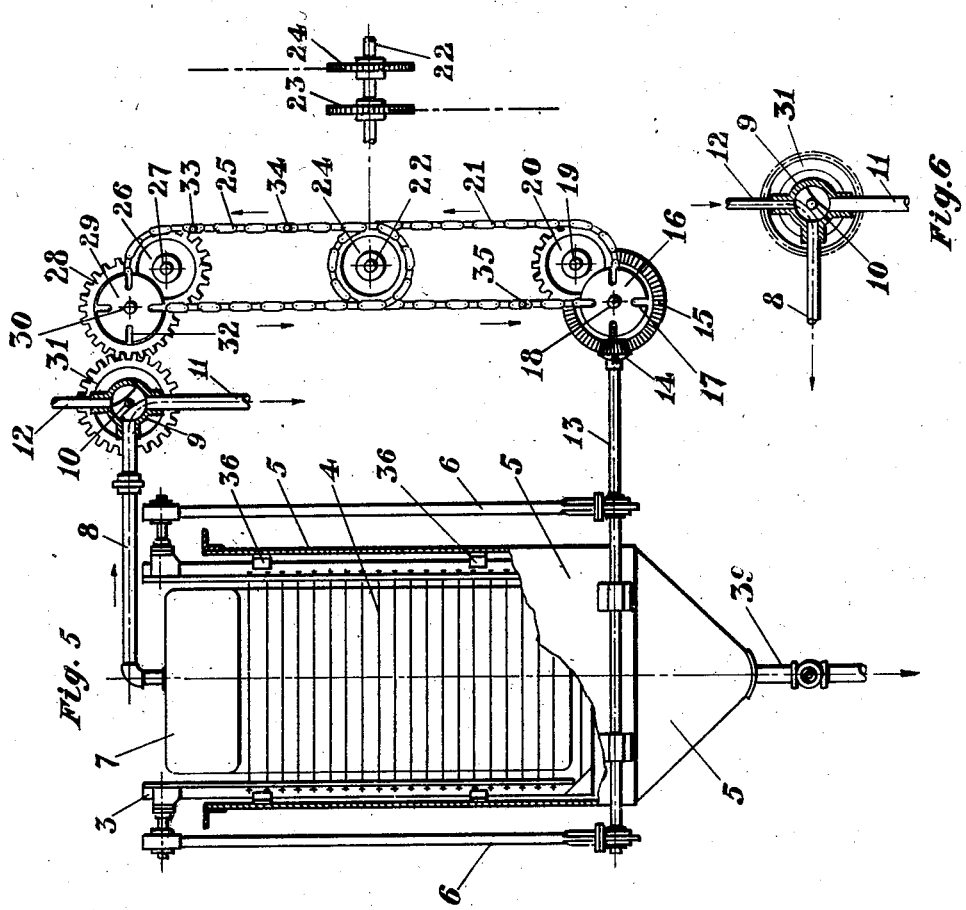

Patented Dec. 26, 1933

1,940,993

UNITED STATES PATENT OFFICE 1,940,993

THICKENER

John F. Borden, Berkeley, Calif., assignor to Oliver United Filters Inc., San Francisco, Calif., a corporation of Nevada Application May 25, 1931. Serial No. 539,712

3 Claims. (Cl. 210—182)

This invention relates to the method of filtering mixtures of liquids and solids commonly known as "thickening", wherein the greater part of the liquid portion of the mixture is separated from the solids by means of a filter medium through which the liquid is drawn (or forced) as filtrate, while the solids, simultaneously caught upon the surface of the filter medium, are periodically dislodged therefrom and thrown back into the unfiltered mixture by means of an automatic reversal of the direction of filtrate flow.

The object of the invention is the provision of an improved method of filtering and thickening mixtures of solids and liquids, with particular reference to the periodic and automatic cleansing of the filtering medium.

In the case of practically all commercial filter thickeners of the present day, the above outlined procedure is effected by the employment of apparatus affording the following basic principles of design.

An open-top tank in which are installed a plurality of filter members, each comprising a hollow or honey-combed chamber with foraminous walls, enveloped in a covering of suitable filter medium. The interior of the chambers are connected, through suitable conduits, to such auxiliary mechanism as shall, when the thickener tank is filled with the mixture to be filtered, promote the flow of filtrate in the direction, and at the time, desired.

The flow of filtrate, during filtration proper, is generally induced by the application of suction to the interior of the chambers and their corresponding conduits; while the reversed or cleansing current of filtrate, is secured by automatic interruption of the suction, and the substitution of positive pressure against the filtrate contained in the chambers and their connecting conduits.

All filter-thickeners designed upon the above described principles, although exhibiting a fair degree of efficiency in their operation, nevertheless, possess in common, one pronounced defect, viz, unsatisfactory provision for complete discharge of the deposited solids from the surface of the filter medium during the period of filtrate flow reversal; with the result that in many cases, especially where the deposit is comparatively thin and of a slimy or gelatinous nature, the filter medium rapidly becomes fouled, and either soon ceases to function altogether, or continues to function at a greatly reduced capacity.

This unsatisfactory condition arises from the fact that in these machines, the discharge of solids from the surface of the filter medium is solely dependent upon the reversal of filtrate flow which alone is not sufficient to secure the effect desired, for in many cases, a film of slime or colloidal matter remains upon the surface of the filter medium after each discharge, and gradually becomes impervious to the flow of filtrate. Furthermore, even in the case of comparatively easily filtering material, the reversal of filtrate flow alone, often but partially discharges the solids from the surface of the filter medium, and thereby reduces the filter medium area available.

I have found that if the surface of the filter medium be ever so lightly scraped or, in many cases, simply rubbed, during the actual period of filtrate flow reversal, the detrimental film referred to above will be destroyed, and the reversed flow of filtrate through the filter medium promoted to such an extent, as to completely free the latter from all deposited solids.

The present invention involves the production of a mechanical scraping or rubbing action upon the exterior surface of the filter medium, in addition to, and simultaneously with, the reversal of filtrate flow during the periodical cleansing of the filter medium.

Thus according to the invention, the mixture to be filtered or thickened, is subjected, while in contact with a filtering medium, to a filtering action, in the course of which, solids are deposited on the surface of the medium; the filtering action is periodically and automatically interrupted, and a cleansing counter current of filtrate forced through the pores of the filter medium; and simultaneously with the flow of cleansing current, a relative movement is provided between the surface of the filter medium and a scraping or rubbing device in contact therewith.

The invention will be better understood by referring to the accompanying drawings which illustrate its unique features.

Fig. 1 is a sketch of one of the filter members 7, comprising a flat framework of woven wire screen 1, enclosed in the enveloping filter medium 2, that portion of the member covered by the medium being fitted within a movable cleaning frame 3, carrying tightly-drawn scraping, rubbing or cleaning wires 4, the latter being in contact with, or in close proximity to, the surface of the filter medium.

Fig. 2 shows a sectional view of Fig. 1, the section being taken on the line A—B of Fig. 1.

Fig. 3 shows an approximate full-size sectional view of a portion of the flat screen frame work 1 of the filter member 7 covered with its enveloping filter medium 2, the latter being held close to the former by means of the tightly-drawn cleaning wires 4. This view shows the relative position of screen framework 1, filter medium 2 and cleaning wires 4 during filtration proper.

Fig. 4 shows the relative position of the parts shown in Fig. 3, during the period of reversed filtrate flow or cleansing period.

Fig. 5 is a sketch of the thickener apparatus during the period of filtration proper, showing one manner of obtaining the reversed filtrate flow simultaneously with the relative movement between filter medium and cleaner frame.

Fig. 6 shows the position of filtrate flow control valve during the reversed filtrate flow or cleansing period.

Fig. 7 is a partial end view of Fig. 5 showing the exterior of the thickener tank 5 together with one of the eccentric rods 6 employed, in this instance, for shifting the position of the cleaning frame 3 with relation to the surface of the filter medium 2.

Referring to the above drawings, one or several filter members 7 of the type above described, are submerged or immersed within the mixture to be thickened contained in the tank 5, proper means being provided for keeping the tank filled with the mixture and the filter elements submerged therein during operation.

The interior of the filter member 7 is connected through the pipe 8 to the automatic valve 9 and its valve plug 10, the position of the latter, as shown in Fig. 5, causing the interior of the filter member 7 to be directly connected to the pipe 11 which leads to a suction pump of suitable type.

When the valve plug 10 is shifted through an angle of 90°, and takes the position shown in Fig. 6, the interior of the filter member 7 is connected to the pipe 12 which communicates with a source of positive pressure such as a supply of clear filtrate under a hydrostatic head, or a source of compressed air.

The motion of the cleaning wires 4 with relation to the surface of the filter medium is secured in this case through the vertical motion of the cleaning frame 3 in the guides 36, which in turn is periodically actuated by the eccentric rods 6, through the agency of the shaft 13.

The valve 9 and the shaft 13 are automatically operated in proper synchronism through the chain-gear mechanism (14 to 35) inclusive, the same being driven by the continuously revolving shaft 22 which is connected to a suitable source of power.

The action of the chain-gear (14 to 35) is as follows: The stem of plug 10 is fastened to a suitable gear 31 which in turn meshes with a gear 28 secured to a shaft 30. To this same shaft is secured the stop-wheel 29, constructed on the principle of the well-known "Geneva stop", and provided with notches 32. Adjacent to the stop-wheel 29, in the proper position, is located the sprocket 26, mounted on a bearing 27, and carrying the link-belt chain 25 which in turn meshes with the sprocket 24 secured to the main drive shaft 22.

A sprocket 23, also secured to shaft 22, carries the link-belt chain 21 which meshes with the sprocket 20 carried by bearing 19. Adjacent to the sprocket 20, in the proper position, is located the stop-wheel 16 secured to the shaft 18. To this same shaft is secured the bevel gear 15 meshing with the pinion 14 which in turn is secured to the shaft 13 whereby the cleaning frame 3 is actuated through the eccentric rods 6.

At proper points on chain 25, are located two pin-rollers 33 and 34 extending beyond the sides of the chain, which being continuously driven as indicated by the arrows, causes the pin-rollers to periodically engage the notches of stop-wheel 29, thus causing the latter to shift through an arc of 90° with the engagement of either pin-roller, with the consequent shifting, through an equal arc, of the plug 10 in the seat of valve 9.

Likewise, in the case of the travel of the chain 21, the pin-roller 35 periodically engages notches 17 of stop-wheel 16 shifting the latter through an arm of 90° with the consequent shifting of the bevel gear 15 through an equal arc at each engagement of the roller-pin 35. The extent of angular movement of the shaft 13, and therefore the extent of linear movement of the cleaner frame 3, at each 90° shift of bevel gear 15, depends upon the gear ratio between bevel gear 15 and pinion 14.

In the scheme of mechanical motion shown in Fig. 5, which is merely for the purpose of illustrating an apparatus by which my invention may be carried out, proper synchronism between the operation of the automatic valve 9 and the movement of the cleaning frame 3, is obtained by assuming drive sprocket 23 to be identical in design with sprocket 24; sprocket 20 to be identical with sprocket 26; stop-wheel 16 to be identical with stop-wheel 29; gear 28 to be identical with gear 31, and chain 21 to be identical with chain 25 as regards number and size of links. The pin-rollers 33 and 34 may then be so located upon chain 25, with respect to the corresponding location of pin-roller 35 on chain 21, and to the position of cleaner frame 3 in the guides 36, as to secure proper coordination in the timing of the several parts involved.

In Fig. 5 the apparatus is shown during the filtration period of the thickening cycle. The eccentric rods 6 are assumed to be at the lowest point of their vertical throw, with the cleaner frame 3 necessarily in a similar position. The amount of vertical throw of the eccentric rods 6 is assumed to equal the pitch distance of the cleaner wires 4, while the gear ratio between bevel gear 15 and pinion 14, is as 4 to 1.

With the tank 5 properly charged with the mixture to be thickened, and the plug 10 of valve 9 stationary in the position shown, filtrate flows through the line 8, valve 9 and line 11, while in the meantime a deposit of solid material is deposited upon the surface of the filter medium 2 of member 7. During this filtration period, the duration of which is limited by the speed of travel and length of the chain 25, plug 10 of valve 9 remains in the position shown due to the fact that pin-rollers 33 and 34 do not engage the notches of stop-wheel 29 during that period. Likewise the cleaner frame 3 remains stationary during the same period on account of the nonengagement of pin 35 with the notches of stop-wheel 16.

At the end of a predetermined period the pin roller 33 passes over sprocket 26 with chain 25 and in doing so, enters the adjacent notch of stop-wheel 29 causing the latter to rotate through an angle of 90 degrees in a clock-wise direction before disengagement. This movement of the stop-wheel 29 causes the plug 10 of valve 9 to be likewise shifted through an angle of 90 degrees by means of the gears 28 and 31 so that it then assumes the position shown in Fig. 6, the suction in pipe 11 thereby being cut off while positive pressure either in the form of compressed air, or clear filtrate under a hydrostatic head, is applied to the filtrate in the pipe 8 and in the interior of the filter member 7, thus causing a reversal of filtrate flow through the pores of the filter medium 2.

Simultaneously with the above described shifting of plug 10 to the position shown in Fig. 6, the shaft 13 is caused to rotate through an angle of 360 degrees, this being accomplished by the pin roller 35 being so located on the chain 21 as to engage an adjacent notch in the stop-wheel 16 at the proper moment.

The turning of the shaft 13 through one complete revolution causes the eccentric rods 6 to raise, and immediately lower the cleaner frame 3, the extent of movement in each direction being equal to the throw of the rods 6, which in turn equals the pitch distance between any two adjacent cleaner wires such as wires 37 and 38 in Fig. 1.

In Fig. 1, each separate engagement of the pin-roller 35 with the notches of the stop-wheel 16 causes any particular cleaner wire, such as wire 37, to move upward to the position of wire 38, and to immediately return to its original position, and it will be noted that by this relatively slight movement of the cleaner frame 3, the entire surface of the filter medium 2, covering the filter member 7, is scraped or rubbed by the cleaner wires 4.

The surface of filter medium 2 having been freed of its deposit of solids by the simultaneous reversal of filtrate flow and the scraping or rubbing action of the cleaner wires, pin-roller 34, due to its particular position on chain 25 then passes over sprocket 26 and in so doing, engages an adjacent notch in stop-wheel 29 causing the latter to again shift through an angle of 90 degrees in a clock-wise direction, resulting in the shifting of plug 10 back to the position shown in Fig. 5, whereby filtration is again resumed.

As long as tank 5 is kept properly charged with material to be thickened and the rotation of drive shaft 22 maintained, the above cycle of alternating filtration periods and cleansing periods will be automatically and continuously repeated, the filtrate produced by the operation flowing to the suction pump via pipes 8 and 11, with the separated solids passing from the bottom of the tank, in the form of a thickened sludge, via the outlet 39.

It is of course to be understood that the mechanism above described is merely one embodiment of my invention and that my invention is to be accorded a range of equivalents consistent with the following claims and the prior art.

I claim:

1. A thickener comprising a tank; a filter leaf submerged in said tank; means for periodically effecting a differential pressure between the exterior and interior of said filter leaf; a grid adjacent the filter leaf and substantially co-extensive with its surface; and means for periodically effecting a relative motion between the filter leaf and said grid.

2. A thickener comprising a tank; a filter leaf submerged in said tank; means for periodically effecting a differential pressure between the exterior and interior of said filter leaf; a grid adjacent each face of said leaf and extending substantially over the entire surface of each face; and means for periodically effecting relative motion between the leaf and said grids.

3. A thickener comprising a tank; a plurality of filter leaves submerged in said tank; means for periodically effecting a differential pressure between the exteriors and interiors of said leaves; wire grids in contact with each face of each leaf and extending substantially over the entire surface of each face; and means for periodically effecting a relative motion between the leaves and grids in a direction parallel to the planes of said grids.

JOHN F. BORDEN.